March 15, 1966 J. H. DUFF ET AL 3,240,699
UPFLOW REGENERATION METHOD

Filed Nov. 2, 1961 2 Sheets-Sheet 1

INVENTORS
JOSEPH H. DUFF
ELI SALEM
BY
*Bonnie Edmonds, Morton Barrows & Taylor*
ATTORNEYS United States Patent Office 3,240,699
Patented Mar. 15, 1966

3,240,699
UPFLOW REGENERATION METHOD
Joseph H. Duff, Elizabeth, N.J., and Eli Salem, Brooklyn, N.Y., assignors to Union Tank Car Company, Chicago, Ill.
Filed Nov. 2, 1961, Ser. No. 149,668
2 Claims. (Cl. 210—35)

This invention relates to the regeneration of ion exchange materials and more specifically to the method of regenerating beds of such ion exchange materials by an upflow technique wherein the bed is maintained in stable and compact form for maximum efficiency in regeneration. The invention has particular application to the regeneration of ion exchange resins used in the art of liquid purification, principally water treatment.

The field of water treatment encompasses the art of water demineralization wherein ionized dissolved materials and salts are removed from raw water supplies. These ionized materials are removed by passing the untreated water through beds of granular or bead-like ion exchange resins. For example, in a typical process, raw water containing dissolved ionized salts is passed first through a bed of cation exchange resin. An ion exchange reaction takes place between the resin and the water changing the dissolved salt to the corresponding acid. The water is then passed through a bed of anion exchange resin where the ion exchange reaction removes the acid. High purity water necessary for the manufacture of fine chemicals, pharmaceuticals, plastics, foodstuffs, fine paper, photographic film and the like is thereby obtained.

After a period of use the ion exchange properties of the resins decrease and the beds become exhausted. To regenerate the resins and make them available for future use, the resin must be regenerated with an acid or alkali solution, depending upon the type of resin. This invention has particular reference to a technique for regenerating a resin bed in an ion exchanger or demineralizer with a minimum of regenerant and with maximum efficiency, thereby reducing down-time of the service unit. More specifically, the invention relates to upflow or countercurrent regeneration.

The measure of the quality of demineralized water coming from a multi-bed installation having both cation exchange and anion exchange units is the amount of "leakage" in the effluent. "Leakage" is the presence of metallic cations in the treated water. In short, it is the presence of metallic ions which were in the raw water but which did not react with the resins in the cation exchanger. One objective in water demineralization is to obtain low leakage.

Leakage is a function of the composition of the influent water, the regenerant dosage, resin bed depth, and ionic distribution within the resin bed. The greater the metallic ion concentration in the influent water the greater the leakage. The greater the regenerant dosage, the less the leakage. The greater the resin bed depth the less the leakage.

Little can be done to alter the composition of the influent water. Using greater regenerant dosages and greater bed depths is uneconomical and sometimes impractical. It remains then, that the control of the ionic distribution within the resin bed itself is one of the most effective ways of controlling leakage.

The normal method of demineralizing water is to flow influent water downwardly through the resin bed. The degree to which the resin particles become exhausted varies from top to bottom. After exhaustion, the prevalence of $H^+$ ions (the ion which the cation resin gives up in the exchange reaction) is greater at the bottom of the bed than at the top indicating that the resins in the upper portion of the bed are more thoroughly exhausted than in the lower. Were the resins to be regenerated by a downflow technique the regeneration would be more complete in the upper portion of the bed and the prevalence of $H^+$ ions would then be greater in the upper portion than in the lower portion.

By flowing the regenerant solution upwardly through the bed, the prevalence of $H^+$ ions becomes greater in the lower portion of the bed. This automatically puts a rich "scrubber zone" in the bottom of the resin bed which zone having a high concentration of $H^+$ ions acts to reduce leakage. Generally speaking, leakage after upflow regeneration is about one-third the leakage after using downflow regeneration. Effluent silica concentrations are also reduced approximately one-half. In view of this, upflow regeneration is the more desirable practice.

The fundamental advantages of upflow regeneration are well known. However, one of the major problems attendant upon the upflow technique is that the force of the regenerant entering at the bottom of the bed tends to expand and upset the bed. Maximum regenerating efficiency is achieved only when the resin particles are kept in close and intimate association with each other. Therefore, bed expansion tends to reduce efficiency.

Moreover, during upflow regeneration, there is a strong tendency for air pockets to form and for the regenerant to cause channeling, and short circuiting; that is, the upflowing liquid will tend to course through a portion of the resin bed offering the least resistance. When this happens the regenerant solution is no longer uniformly flowed through the bed and there is a resulting loss of efficiency in the regenerating step. The resins in such case are not uniformly regenerated and excessive quantities of regenerant are therefore needed. The upsetting of the resin bed may be avoided to some degree by limiting the flow rate but this then tends to increase outage time making the process impractical.

Several techniques for maintaining the resin bed in a stable and compact condition are known. One technique is to introduce a downflow of liquid, such as water, in opposition to the upflowing regenerant whereby the downflowing liquid acts to block the migration of the regenerant and to suppress the expansion of the resin bed. Another is to mechanically hold the bed firm by means of a grid placed upon the top of the resin bed. These techniques are lacking in that they either require excessive quantities of additional liquid, extra piping, or additional and cumbersome equipment. The invention overcomes the above limitations by using simple mechanical devices and obtaining maximum functional utility of all the parts of an ion exchanger.

Operation of the regenerating system will be more readily understood by reference to a drawing which shows a preferred embodiment of my invention.

Figure 1:
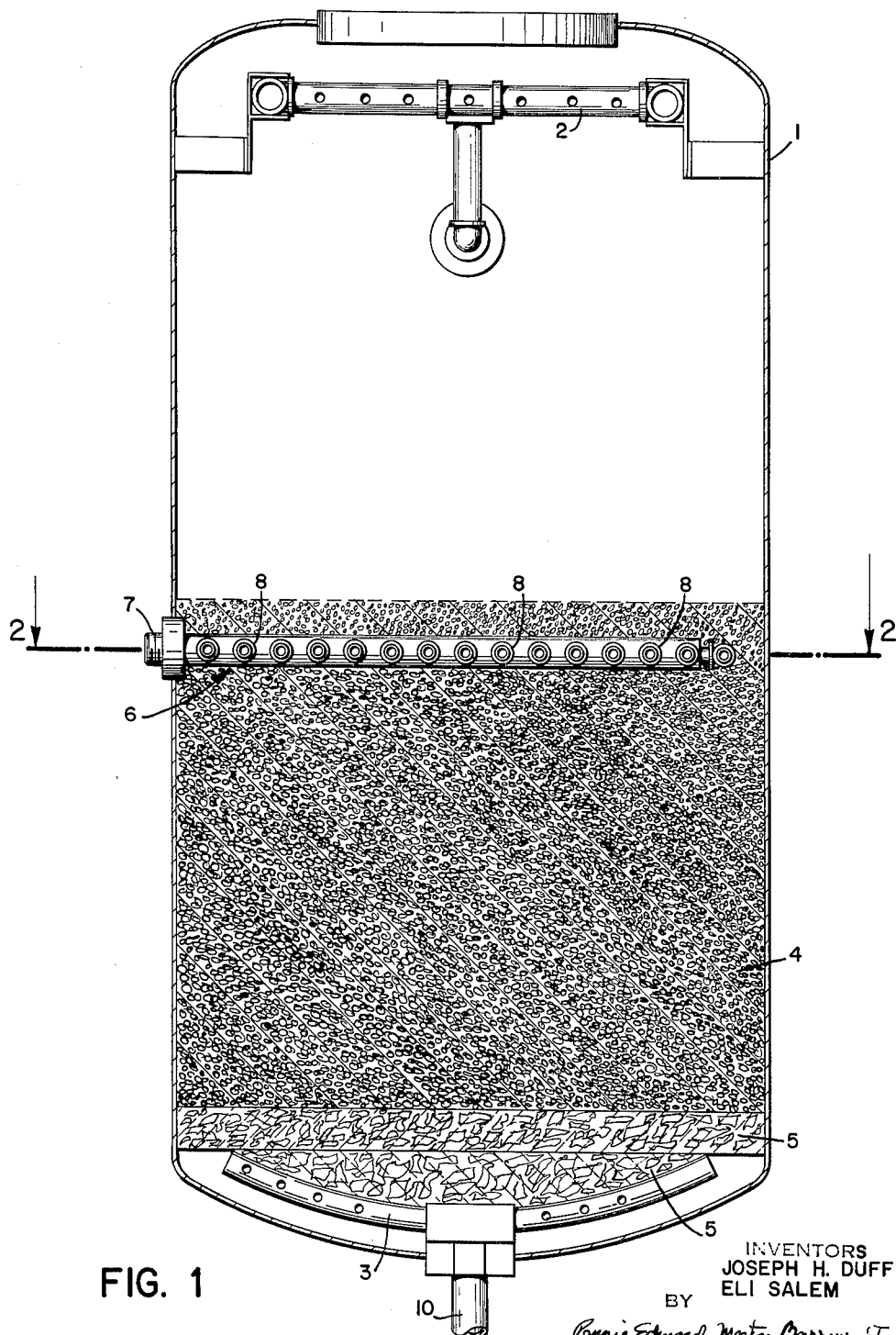
FIG. 1 is a sectional elevation of an ion exchanger showing the disposition of the internal parts in relation to the compacted resin bed.

Referring to FIG. 1 the ion exchange unit has a tank 1, an upper distributor 2, and a lower distributor 3. Partially filling the tank 1 is the ion exchange resin bed 4 supported by a graded bed support fill 5. The resin bed 4 as shown in FIG. 1 is in a compacted state immediately prior to regeneration. A regenerant collector, generally denoted as, is secured to tank 1 and is situated intermediate of the upper distributor 2 and the lower distributor 3. The regenerant collector 6 is further situated such that when the ion exchange resin bed 4 is in its compacted state, the regenerant collector 6 is several inches below the upper surface of the resin bed 4.

Figure 2:
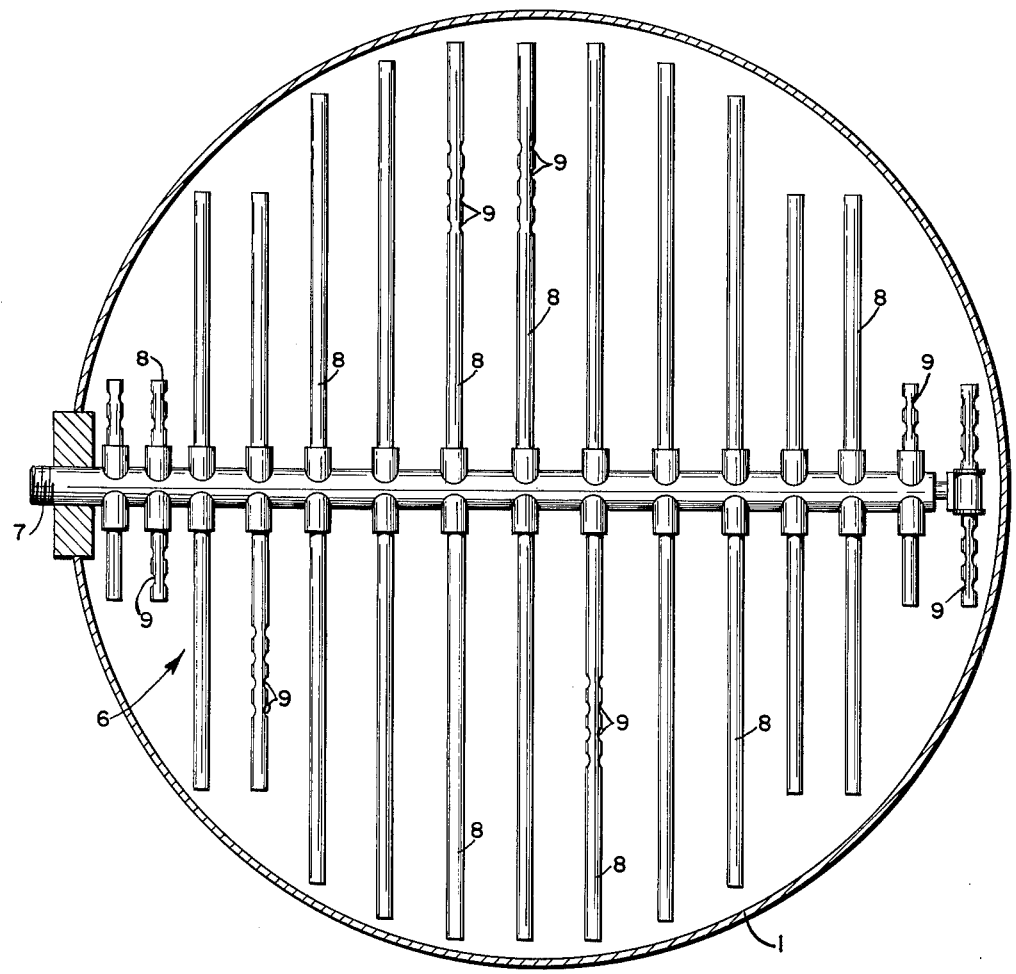
FIG. 2 is a plan view of the intermediate regenerant collector.

Referring to FIG. 2 the regenerant collector 6 has a header 7 with laterals 8 disposed perpendicularly thereon and in communication with the header 7. The laterals 8 have ports 9 in communication with the interior of the laterals 8.

In the steps to be discussed below, the points of introduction of the liquids will vary. However, during the entire cycle of service, backwash, regeneration, and rinse the tank 1 is always filled with liquid.

During the service or exhaustion cycle raw water is introduced into the top of the tank 1 through the upper distributor 2. The water flows downwardly through the resin bed 4 through the bed support 5 and is collected by the lower distributor 3. The lower distributor 3 is in communication with an outlet 10, and the treated water may thereby be directed to service.

When the ion exchange resins have become exhausted the resin bed 4 is backwashed to remove any solid material which might have collected. During the backwashing step water is introduced into the tank through the lower distributor 3, usually at a rapid rate, and flowed upwardly through the bed support 5 and through the resin bed 4. The resin bed 4 is thereby caused to expand and the water is allowed to flow upwardly through the expanded bed. Backwash water is drawn off through the upper distributor 2 and directed to waste. Near the end of the backwash step, the intermediate collector 6 may be separately backflushed by flowing water in through the collector 6 and drawing it off through the upper distributor 2.

After a sufficient backwashing period, during which the resin particles are distributed throughout the tank, the backwash cycle is stopped and the water allowed to remain filling the tank 1. A settling step then follows, the resin particles being allowed to drift downwardly and to settle until a bed is again formed. The bed so formed is not ideally suited for regenerating because it is not at this point in a compact state. Therefore, the settling step is followed by a compacting step.

During the compacting step water is introduced through the upper distributor 2 and flowed downwardly through the resin bed 4 and through the bed support 5, outwardly through the lower distributor 3, and to waste via outlet 10. The force of the water so flowing tends to bring the resin particles in closer association with each other and to compact the resin bed 4.

The regenerating step generally involves introducing regenerant solution through the lower distributor 3 and flowing it upwardly through bed support 5, through the resin bed 4 and drawing it off through the regenerant collector 6. The regenerant solution comprises dilution water to which is added the regenerant chemical. The regenerant chemical is usually added after the introduction of the dilution water into the tank 1 has begun.

Several factors are important in the successful practice of the regenerating step. The design and placement of the regenerant collector 6 has been found to be of particular importance. It has been discovered that a collector having a horizontal cross-sectional area of approximately 25% of the horizontal cross-sectional area of the resin bed is highly effective in mechanically suppressing the expansion of the resin bed yet has sufficient spacing between the laterals to allow uniform and efficient collection of regenerant. Further, the spacing is sufficient to allow expansion of the bed throughout the tank 1 during the backwashing step. The effectiveness of the regenerant collector 6 in suppressing bed expansion is further increased by positioning the collector 6 several inches below the surface of the compacted resin bed 4. When the regenerant collector 6 is so placed, the upflowing regenerant migrates somewhat into the bed area above the collector 6 and completely surrounds the collector 6. This surrounding flow of regenerant aids in the uniform withdrawal of the liquid into and through the laterals 8. In the preferred embodiment of this invention the laterals have a screen wrapping, not shown, which prevents clogging of the ports 9 and also aids in the uniform withdrawal of regenerant into the laterals 8. Since the regenerant is drawn off at a level within the resin bed 4 itself, the tendency of the bed to expand is reduced. Thus, the resin bed is kept stable.

The flow rate of the upflowing regenerant solution is generally moderate. The upflow rate during regeneration is lower than the rapid upflow rate during backwashing where the objective is to expand and regrade the bed and remove foreign matter. However, even though the upflow rate during regeneration is lower than during backwashing, the regenerating upflow can still be maintained at a relatively higher rate than would be possible in the absence of the regenerant collector 6 being designed and positioned as above described. Therefore, relatively more rapid regenerant flow rates being possible, down time for the unit is shortened.

At the start of the regeneration step it has been found desirable to gradually increase the upflow dilution water flow rate, then after the normal dilution water rate is attained, begin the flow of regenerant chemical into the dilution water, prior to its entering the unit. This gradual increase in the flow rate avoids local short circuiting or channeling around the lower distributor 3.

After the required regenerant chemical is introduced, the regenerant solution within the resin voids is displaced, usually at the same rate as the dilution water flow introduced through the distributor 3 and out the regenerant collector 6.

The regenerating step is followed by a rinsing step whereby the distributors 2 and 3, the regenerant collector 6 and the resin bed 4 are all rinsed by a rapid downflow of water from the upper distributor 2 and in part from the regenerant collector 6. The unit is then again ready for service.

The compacting step described herein preferably uses water as the compacting means. Other means might be equally suitable such as vibrators or other mechanical devices for bringing the resin particles into intimate contact.

It is also understood that the practice of this invention may be supplemented by additional means for suppressing bed expansion without departing from the spirit of the invention.

To further illustrate the invention a specific example of the method in actual operation is described below.

An ion exchanger tank containing 55 cubic feet of cation exchange resin of the 8% crossed-linked styrene-divinylbenzene type was used in a service run. Raw water was passed downwardly through the resin bed at flow rates of 72 to 92 gallons per minute. At the end of the service run, all valves were closed for a period of about one minute.

The resin bed was then backwashed. A backwash inlet valve was opened allowing water to enter into the lower distributor in the lower part of the tank and to flow upwardly at a rate of about 92 g.p.m. through the resin bed. A backwash outlet valve was also opened permitting the backwash water to be drawn off from the top of the tank and directed to a sump. The backwash step took 10 minutes.

The intermediate regenerant collector was then separately backflushed for a period of two minutes. All valves were then closed and the resin particles allowed to settle. The settling step took five minutes.

The resin bed was then packed by flowing water downwardly from the upper distributor through the resin bed at a rate of about 92 g.p.m. for 5 minutes. The water was drawn off through the lower distributor and directed to waste.

The regenerating step using the upflow technique incorporated four phases. In the first phase, dilution water was gradually introduced over a period of about five minutes through the lower distributor until a flow rate of about 20 g.p.m. was achieved, the water being drawn off at the intermediate collector. The intermediate regenerant collector was situated approximately three inches below the surface of the packed resin bed and covered approximately 25% of the horizontal cross-sectional area of the bed. After the dilution water flow was established at about 20 g.p.m., concentrated sulfuric acid (66° Bé.) was introduced into the dilution water stream at a rate of about 0.38 g.p.m., so as to give an acid concentration of 3% entering the unit. This second phase continued for about 27 minutes. In the third phase 6% acid was introduced into the unit by increasing the concentrated acid flow to about .76 g.p.m. while maintaining the dilution rate of water of about 20 g.p.m. This phase lasted 20 minutes. The acid flow was then discontinued and the water continued to flow in for an additional 18 minutes, displacing all the acid.

The unit was then flushed by flowing rinse water into the tank through both the upper distributor and intermediate regenerant collector for two minutes at the rate of about 92 g.p.m. The rinsing continued for an additional 20 minutes by a downflow, at the rate of about 92 g.p.m. through the upper distributor alone.

After the rinse step the unit was again ready for service.

We claim:

1. The method of regenerating a bed of ion exchange materials within a confined area comprising:
   (a) backwashing by flowing liquid upwardly through said bed thereby expanding said bed,
   (b) settling by discontinuing said upward flow of liquid thereby allowing said ion exchange materials to settle whereby said bed is re-formed,
   (c) fully compacting said re-formed bed by rapidly flowing liquid downwardly through said bed, then
   (d) regenerating said fully compacted bed by flowing regenerant solution upwardly through said fully compacted bed at a moderate rate while
      (i) restraining said fully compacted bed against upward expansion by maintaining a mechanical barrier having an area approximately 20% to 40% of the corresponding cross-sectional area of said fully compacted bed in a plane immediately below the upper surface of said fully compacted bed, and
      (ii) drawing off said regenerant solution substantially at said plane.

2. The method of regenerating a bed of ion exchange materials within a confined area comprising:
   (a) backwashing by flowing liquid upwardly through said bed thereby expanding said bed,
   (b) settling by discontinuing said upward flow of liquid thereby allowing said ion exchange materials to settle whereby said bed is re-formed,
   (c) fully compacting said re-formed bed by rapidly flowing liquid downwardly through said bed, then
   (d) regenerating said fully compacted bed by flowing dilution liquid at a gradually increasing rate upwardly through said fully compacted bed until a moderate flow rate is attained and then introducing concentrated regenerant into said dilution liquid at increasing rates, while
      (i) restraining said fully compacted bed against upward expansion by maintaining a mechanical barrier in a plane immediately below the upper surface of said fully compacted bed, and
      (ii) drawing off said regenerant solution substantially at said plane.

References Cited by the Examiner

UNITED STATES PATENTS

| | | | |
|---|---|---|---|
| 1,962,663 | 6/1934 | McGill | 210—30 |
| 2,773,829 | 12/1956 | Hunting | 210—279 |
| 2,891,007 | 6/1959 | Caskey et al. | 210—279 |

MORRIS O. WOLK, *Primary Examiner.*

ALEXANDER WYMAN, *Examiner.*